United States Patent [19]

Birrell et al.

[11] 4,212,788

[45] Jul. 15, 1980

[54] PROCESS FOR PRODUCING POLYMALEIC ANHYDRIDE

[75] Inventors: Raymond N. Birrell, Brooklands; Norman E. Royle, Urmston, both of England

[73] Assignee: Ciba-Geigy (UK) Limited, London, England

[21] Appl. No.: 962,566

[22] Filed: Nov. 16, 1978

Related U.S. Application Data

[63] Continuation of Ser. No. 813,772, Jul. 7, 1977, abandoned.

[30] Foreign Application Priority Data

Jul. 22, 1976 [GB] United Kingdom ............... 30523/76

[51] Int. Cl.$^2$ ....................... C08F 122/06; C08K 5/01
[52] U.S. Cl. .............................. 260/33.6 UA; 252/82; 252/174.24; 260/546; 526/227; 526/271

[58] Field of Search ....................... 260/546, 33.6 UA; 526/227, 271

[56] References Cited

FOREIGN PATENT DOCUMENTS

| 1366468 | 6/1964 | France. |
| 668574 | 3/1952 | United Kingdom. |
| 1024725 | 4/1966 | United Kingdom. |
| 1411063 | 10/1975 | United Kingdom. |

Primary Examiner—Stanford M. Levin
Attorney, Agent, or Firm—Wenderoth, Lind & Ponack

[57] ABSTRACT

The invention relates to a process for making polymaleic anhydride by polymerizing maleic anhydride in a solvent mixture of xylene, the ortho isomer content of which is up to 99%, and a non-reactive solvent having a boiling point of from 110° to 180° C. using di-tertiary butyl peroxide as catalyst.

7 Claims, No Drawings

PROCESS FOR PRODUCING POLYMALEIC ANHYDRIDE

This application is a continuation of application Ser. No. 813,772, filed July 7, 1977, now abandoned.

The present invention relates to the polymerisation of maleic anhydride.

U.K. Patent Specification No. 1411063 describes a process for the manufacture of polymaleic anhydride comprising polymerising maleic anhydride in xylene as solvent, the ortho-isomer content of the xylene being up to 99%, and using di-tertiary butyl peroxide as polymerisation catalyst.

The product produced by that process has a high level of activity, but we have now surprisingly found that if part of the xylene, which is a reactive solvent, is replaced by a non-reactive solvent, polymaleic anhydride having enhanced activity is produced.

Accordingly, the present invention provides a process for the manufacture of polymaleic anhydride which comprises polymerising maleic anhydride in a solvent mixture of xylene, the ortho isomer content of which is up to 99%, and a non-reactive solvent having a boiling point within the range of 110° to 180° C., and using di-tertiary butyl peroxide as polymerization catalyst.

The non-reactive solvent is preferably one having a boiling point within the range of 120° to 160° C., most preferably within the range of 125° to 140° C. Suitable non-reactive solvents are paraffins, particularly mixtures of paraffins having from 8 to 12 carbon atoms; chlorinated paraffins, such as tetrachloroethane and tetrachloroethylene; chlorinated aromatic hydrocarbons, particularly chlorinated benzene, such as monochlorobenzene and dichlorobenzene; and esters such as n-butyl acetate and iso-amyl acetate. Preferably the non-reactive solvent is monochlorobenzene.

The xylene may be a commercial xylene, the ortho-isomer content of which is not greater than 70%. We prefer to use xylene having an ortho-isomer content of from 1 to 25%. The proportion of meta- and para-isomers is not critical.

The ratio of non-reactive solvent to xylene may be varied over a wide range, the actual ratio being chosen according to whether a higher yield of polymer is required or whether a somewhat lower yield of polymer coupled with higher activity is preferable. For example, the ratio of non-reactive solvent to xylene may be from 0.1:1 to 10:1 by weight, preferably from 1:1 to 10:1, more preferably from 1:1 to 5:1 and most preferably about 2:1. If the amount of xylene relative to the non-reactive solvent is raised above these limits a high yield of polymer is obtained, but the polymer has a relatively lower, but still useful, level of activity. On the other hand, if the amount of xylene is lowered below these limits, the yield of polymer is considerably reduced.

The ratio of maleic anhydride to the total amount of solvents may range, for example, from 2:1 to 1:3 by weight, preferably from 1:1 to 1:1.5 by weight. The amount of di-tertiary butyl peroxide polymerisation initiator may be, for example, from 15 to 40% by weight based on the amount of maleic anhydride, although the preferred amount is from 20 to 35% by weight. The polymerisation initiator may be added slowly over a period of time, e.g. up to 4 hours, alone or in admixture with a proportion of the solvent mixture.

The polymerisation reaction may be carried out at an elevated temperature of, for example, 120° C. to 145° C., preferably from 130° C. to 140° C. Reaction times can vary over a wide range, but times of from 4 to 8 hours have been found to be particularly suitable.

The polymer which is obtained by the process of the present invention is usually in the form of a mobile oil at temperatures above 65° C. when it may be easily separated from the solvent mixture by a decanting process or through a valve in the bottom of the reaction vessel. Preferably the separation is carried out at temperatures of from 60° to 120° C.

Where the polymer does not separate from the solvent mixture it can be isolated by extraction into water, acid or alkali.

The solvent mixture may be recovered and directly recycled for further use without any treatment being required.

The polymer may be isolated as the anhydride or it may be hydrolysed to the corresponding acid or its salts. The hydrolysis can be carried out using water, an acid or an alkali, but preferably water. Where the polymer has been isolated by extraction into water, acid or alkali it will already be in the hydrolysed form.

The polymaleic anhydride or its derivatives are useful for a number of important purposes. For example, polymaleic acid and its water soluble salts exhibit threshold and crystal modifying effects which can be utilized in the control of scales, such as form in, for example, boilers, evaporators, e.g. sea-water evaporators, and industrial cooling plants. They also show special utility as chemical intermediates, as additives to other polymer systems and as corrosion inhibitors for metal surfaces, particularly in the presence of zinc salts. They may also be used as detergent builders.

The polymaleic anhydride obtained by the process of the invention has surprisingly shown enhanced activity in such uses when compared with polymaleic anhydride produced by other processes. We believe that this is because the amount of xylene chemically incorporated in the polymer is considerably less than when xylene alone is used as solvent. The ratio of xylene radicals to maleic anhydride radicals in the product of the invention is from 0.02:1 to 0.07:1, usually about 0.04:1, whereas, the ratio in polymaleic anhydride produced in a process using xylene as the only solvent is from 0.12:1 to 0.2:1, usually about 0.14:1.

The invention is illustrated by the following Examples.

The commercial xylene used had the following analysis by weight:

| | |
|---|---|
| Benzene | 0.001% |
| Toluene | 0.098% |
| Ethyl benzene | 17.051% |
| p-xylene | 19.007% |
| m-xylene | 43.745% |
| o-xylene | 20.051% |

EXAMPLE 1

300 g. maleic anhydride, 200 g. monochlorobenzene and 100 g. xylene are charged to a reaction vessel and heated to reflux at 140° C.

100 g. di-tert-butyl peroxide, 100 g. monochlorobenzene and 50 g. xylene are mixed at room temperature and added over 4 hours to the refluxing solution of maleic anhydride.

Reflux is continued for 4 hours after the addition is complete. The reaction mass is now cooled to 100° C. and the polymer allowed to settle. The lower anhydride polymer layer (approximately 328 g.) is run off into 300 g. water at 80° C. with agitation. The mass is heated to reflux at 100° C. for ½ hour to complete hydrolysis and then cooled to 60°–70° C. Approximately 60 g. monochlorobenzene/xylene mixture are then distilled off at a temperature of 60°–70° C. at 20 mm. Hg. pressure over approximately ½ hour. The product is finally filtered to clarify.

The yield was 574.8 g. 50% w/w solution which is equal to 191.6% weight yield based on the weight of maleic anhydride charged.

The product was a yellow to amber mobile liquid having a solids content 50% w/w.

EXAMPLE 2

The general procedure was as described in a paper by Elliot et al in the 3rd International Symposium on Fresh Water from the Sea, Vol. 1, p.46, and is broadly as follows. Sea water was treated with the quantities of additive specified in the examples below and continuously fed to a test cell from which there was a corresponding discharge of brine. The contents of the cell were mixed by an air sparge which also served to remove carbon dioxide released from solution, and were heated by condensing steam with a U-tube (placed centrally in the cell) to maintain the temperature at the required value for a period of two weeks, after which the scale that had formed on the U-tube and the walls of the cell was removed, dried and weighed. The scaling rate for the tube was calculated as that weight of scale formed on the U-tube per liter of sea-water fed to the cell and the total scaling rate as the weight of scale formed both on the U-tube and the walls of the cell per liter of sea-water fed to the cell.

In each case the product used was polymaleic anhydride, the solvent used being xylene and monochlorobenzene (MCB), as shown in Table I below. It can be seen that even though the product produced using xylene alone was very active, the product produced using a mixture of solvents was even more active.

TABLE I

| Solvent | Concn. ppm. | Scaling Rate (mg/l) Tube | Total |
|---|---|---|---|
| 2:1 MCB/xylene | 3 | 0.6 | 4.1 |
| 5:1 MCB/xylene | 3 | 1.3 | 12.1 |
| 1:1 MCB/xylene | 3 | 1.72 | 22.8 |
| 2:1 MCB/xylene | 3 | 0.17 | 5.9 |
| xylene | 3 | 2.35 | 23.1 |
| Blank | nil | 14.4 | 51.0 |

EXAMPLE 3

A synthetic brine is fed continuously to a test system consisting of a steam heated single tube heat exchange, flow meter, air sparge cell, heat rejection section and a recirculation pump. Recirculating brine is removed from the air sparge cell by means of a pump to maintain the concentration factor of the system between 1.00 and 1.10.

The synthetic brine, containing the desired concentration of additive, is fed to the test system at 3.5 liters/hour and the test period is 65 to 67 hours, i.e. a total brine input of 223 to 235 liters. Temperature rise through the heater is 4° C. and the top temperature is set at 95° to 96° C.

At the end of the test period the system is dismantled and the weight of scale deposited on the heat exchange tube determined by weighing. Scale deposited on the height exchanger walls is dissolved in a known volume of acid, the magnesium and calcium content of which is then determined by titration and expressed as a weight of magnesium hydroxide.

Results are expressed as milligram of scale per liter of synthetic brine feed with the total scaling rate being the sum of the tube and wall scaling rates.

In each case the product used was polymaleic anhydride, the solvent being xylene and monochlorobenzene (MCB), as shown in Table II below.

TABLE II

| Solvent | Concn. ppm. | Scaling Rate (mg/l) Tube | Total |
|---|---|---|---|
| 2:1 MCB/xylene | 2 | 1.0 | 2.3 |
| 2:1 MCB/xylene | 3 | <1.0 | <1.0 |
| xylene | 2 | 2.6 | 3.4 |
| xylene | 3 | 1.5 | 3.0 |
| Blank | 0 | 15.0 | 20.2 |

It can be seen from Table II that the product produced according to the invention is more active than polymaleic anhydride produced using xylene as the solvent.

We claim:

1. In the process for the manufacture of polymaleic anhydride which comprises polymerizing maleic anhydride in a xylene solvent the ortho isomer content of which is up to 99% utilizing di-tertiary butyl peroxide as polymerization catalyst, the improvement according to which a portion of the xylene solvent is replaced by an amount of monochlorobenzene such that the ratio of monochlorobenzene to xylene solvent is from 1:1 to 10:1 by weight.

2. The process of claim 1 wherein the xylene has an ortho isomer content of from 1 to 25%.

3. The process of claim 1 wherein the ratio of maleic anhydride to the total amount of solvents is from 2:1 to 1:3 by weight.

4. The process of claim 1 wherein the amount of di-tertiary butyl peroxide is from 15 to 40% by weight based on the weight of maleic anhydride.

5. The process of claim 1 which is carried out at a temperature of from 120° to 145° C.

6. The process of claim 1 wherein the resulting product is hydrolysed using water, an acid or an alkali.

7. Polymaleic anhydride produced by the process of claim 1 containing xylene radicals in the polymer and wherein the ratio of xylene radicals to maleic anhydride radicals is from 0.02:1 to 0.07:1.